(12) United States Patent
Ye

(10) Patent No.: US 12,734,621 B2
(45) Date of Patent: Sep. 15, 2026

(54) LOCKING SCREW MACHINE

(71) Applicant: ALLIEDFOREST HOLDINGS GROUP LIMITED, Hong Kong (CN)

(72) Inventor: Yujian Ye, Hong Kong (CN)

(73) Assignee: ALLIEDFOREST HOLDINGS GROUP LIMITED, Hong Kong (CN)

( * ) Notice: Subject to any disclaimer, the term of this patent is extended or adjusted under 35 U.S.C. 154(b) by 498 days.

(21) Appl. No.: 18/462,415

(22) Filed: Sep. 7, 2023

(65) Prior Publication Data

US 2025/0083268 A1 Mar. 13, 2025

(51) Int. Cl.
*B23P 19/06* (2006.01)
*B23P 19/10* (2006.01)

(52) U.S. Cl.
CPC ............... *B23P 19/06* (2013.01); *B23P 19/10* (2013.01)

(58) Field of Classification Search
CPC ......... B23P 19/06; B23P 19/10; B23P 19/001; B23P 19/12; B25B 23/14; B25B 23/147; B23Q 1/621
USPC ....................................................... 310/12.05
See application file for complete search history.

(56) References Cited

U.S. PATENT DOCUMENTS

2024/0227096 A1* 7/2024 Sun .......................... G06T 7/73

FOREIGN PATENT DOCUMENTS

CN 108907652 A * 11/2018 .............. B23P 19/10
CN 112108889 A * 12/2020 ............. B23Q 1/621
CN 114012427 A * 2/2022 ........... B65G 47/248
CN 115106766 A * 9/2022 ............. B25B 11/00

OTHER PUBLICATIONS

CN-114012427 Espacenet Translation; Tang, Dao-yuan; Feb. 8, 2022 (Year: 2022).*
CN-115106766 Espacenet Translation; Li, Hui-hui; Sep. 27, 2022 (Year: 2022).*
CN-112108889 Espacenet Translation; Liang, Guan-xi; Dec. 22, 2020 (Year: 2020).*
CN-108907652 Espacenet Translation; Wei, Jin-ying; Nov. 30, 2018 (Year: 2018).*
FabPlus Machinery YouTube video; Fence Screwing Machine; https://www.youtube.com/watch?v=glclpCH3Ock&t=61s; Jun. 1, 2021 (Year: 2021).*

* cited by examiner

*Primary Examiner* — Brian D Keller
*Assistant Examiner* — Sidney D Full

(57) ABSTRACT

A locking screw machine, comprises a discharging table, an alignment module, an electric screwdriver module, a positioning camera, the discharging table comprises at least two first discharging tables and at least two second discharging tables which are arranged on a workbench at intervals along a first direction, along a second direction, a first workpiece is placed on the first discharging tables, a plurality of second workpieces are arranged on the second discharging tables, two ends of the second workpieces are inserted into first holes of the first workpieces on both sides of the second workpieces, the alignment module is configured to push the second workpieces so the plurality of second workpieces are aligned along the second direction, the electric screwdriver module is configured to drive a screw into a second hole of the first workpiece and screw it; the positioning camera is configured to identify the second location hole.

12 Claims, 6 Drawing Sheets

20
z
y
x
70
22
212
211
21
22
221
212
211
21
70

LOCKING SCREW MACHINE

TECHNICAL FIELD

Embodiments of the present application relate to the technical field of screw fastening equipment, and in particular, relate to a locking screw machine.

BACKGROUND

In the production and assembly of mechanical equipments, two or more workpieces, especially fence workpieces, are often fixed by screws passing therethrough. When fixing by screws, the tightening torque of screws is an important parameter to ensure the reliability of threaded connection; and a tightening gun is an electric wrench tool. In production, the tightening gun is often used to assist the tightening of screws so as to accurately control the tightening torque of screws.

However, in the process of implementing the present invention, the applicant found that during the installation of screws, it is necessary to manually place a screw on the output shaft of the tightening gun, then lift the tightening gun and align the screw thereon with the threaded hole, and finally start the tightening gun to complete the installation of one screw, and the above process is repeated in order to complete the installation of all screws, and thus the operation of workers is cumbersome during the assembly.

Therefore, in order to improve the efficiency of locking screws, there is an urgent need for a multifunctional intelligent screwdriving equipment.

SUMMARY

An embodiment of the present application aims to provide a locking screw machine to simplify the operation of workers and improve the production efficiency.

The embodiment of the present application adopts the following technical solution to solve the technical problems:

A locking screw machine is provided, which comprises:

- a machine frame, a workbench being arranged at the top of the machine frame;
- a discharging table, comprising at least two first discharging tables and at least two second discharging tables, the at least two first discharging tables being arranged on the workbench at intervals along a first direction, the at least two second discharging tables being arranged on the workbench at intervals along the first direction, the at least two first discharging tables being arranged at the outer side of the at least two second discharging tables, a first workpiece being placed on one of the first discharging tables along a second direction, a plurality of second workpieces being arranged on the at least two second discharging tables at intervals along the first direction, and two ends of the second workpieces are respectively inserted into first location holes of the first workpieces on both sides of the second workpieces;
- an electric screwdriver module, being arranged on the machine frame, and being configured to drive a screw into a second location hole of the first workpiece and screw the screw to realize the fixation of the first workpiece and the second workpiece;
- a positioning camera, being arranged on the electric screwdriver module and being communicatively connected with the electric screwdriver module, and being configured to identify the second location hole on the first workpiece;
- a driving unit, being arranged on the machine frame and connected with the electric screwdriver module, and being configured to drive the electric screwdriver module to move so as to change the spatial position of the electric screwdriver module;
- an alignment module, being arranged on the workbench, being arranged at the outer side of the first discharging table along the first direction, and being configured to push the plurality of second workpieces along the first direction so that the plurality of second workpieces are aligned along the second direction;
- wherein the first direction and the second direction are perpendicular to each other, and axes of the first location hole and the second location hole are perpendicular to each other.

As a further improvement of the above solution, the top of the first discharging table is lower than the top of the second discharging table along a third direction, and the third direction is perpendicular to both the first direction and the second direction.

As a further improvement of the above solution, the alignment module comprises an alignment plate movably connected to the workbench, the alignment plate is capable of sliding relative to the workbench in the first direction, and the alignment plate is capable of moving upward and downward relative to the workbench in the third direction.

As a further improvement of the above solution, the alignment module comprises a first cylinder and a positioning plate connected with a telescopic end of the first cylinder, the first cylinder is installed on the workbench, the telescopic end of the first cylinder is capable of extending and retracting in the third direction, the positioning plate is arranged between the alignment plate and the workbench, and the alignment plate is slidably installed on the positioning plate.

As a further improvement of the above solution, the first discharging tables comprise first limiting grooves, and one of the first workpieces is arranged in one of the first limiting grooves;

- the second discharging tables are provided with a plurality of second limiting grooves at intervals along the second direction, and one of the second workpieces is arranged in one of the second limiting grooves.

As a further improvement of the above solution, in the first direction, the first discharging table and the second discharging table at the same side are disposed adjacent to each other, and the first discharging table and the second discharging table at the same side are capable of sliding relative to the workbench in the first direction.

As a further improvement of the above solution, the workbench is provided with a first slide rail below the discharging table, the first slide rail extends along the first direction, two first sliding blocks are slidably arranged on the first slide rail, and the first discharging table and the second discharging table at the same side are all fixed to one of the first sliding blocks.

As a further improvement of the above solution, in the first direction, positioning pieces are provided respectively at two sides of the first slide rail, and the spacing between the two positioning pieces is adjustable.

As a further improvement of the above solution, the first discharging table comprises a plurality of limiting blocks, and the first limiting groove is enclosed by the plurality of limiting blocks, or the first limiting groove is enclosed by the plurality of limiting blocks together with the second discharging table.

As a further improvement of the above solution, in the first direction, an avoidance groove is provided at the position of the alignment plate that corresponds to the limiting block.

As a further improvement of the above solution, the driving unit comprises a first driving unit, a second driving unit and a third driving unit, wherein the first driving unit is configured to drive the electric screwdriver module to slide along the second direction, the second driving unit is configured to drive the electric screwdriver module to slide along the first direction, and the second driving unit is configured to drive the electric screwdriver module to slide along the third direction.

As a further improvement of the above solution, the first driving unit is installed on the machine frame, the first driving unit comprises a first driving source and a first sliding seat connected with an output end of the first driving source, and the electric screwdriver module is installed on the first sliding seat;

the second driving unit is installed on the first sliding seat, the second driving unit comprises a second driving source and a second sliding seat connected with an output end of the second driving source, and the electric screwdriver module is installed on the second sliding seat;

the third driving unit is installed on the second sliding seat, the third driving unit comprises a third driving source and a third sliding seat connected with an output end of the third driving source, and the electric screwdriver module is installed on the third sliding seat.

As a further improvement of the above solution, the locking screw machine comprises a jacking mechanism;

the jacking mechanism comprises a second cylinder which is fixed below the second discharging table, an telescopic end of the second cylinder penetrates through the first discharging table, and the telescopic end of the second cylinder is capable of extending and retracting along the third direction.

As a further improvement of the above solution, the locking screw machine comprises an operation panel;

the operation panel is electrically connected with the alignment module, the electric screwdriver module, the driving unit and the positioning camera respectively.

As compared to the prior art, the locking screw machine provided according to the embodiment of the present application can realize the alignment of a plurality of second workpieces at one time through the alignment module, and in addition, the positioning camera identifies the second location hole on the first workpiece so that the electric screwdriver module can automatically drive the screw into the second location hole under the drive of the driving unit to realize the fixed connection between the first workpiece and the second workpiece, thereby saving labor and improving production efficiency.

BRIEF DESCRIPTION OF THE DRAWINGS

One or more embodiments are illustrated by corresponding attached drawings, and this does not constitute limitation to the embodiments; elements with the same reference numerals in the attached drawings represent similar elements, and unless otherwise specified, the figures in the attached drawings do not constitute scale limitation.

In the attached drawings.

Figures 1, 2:
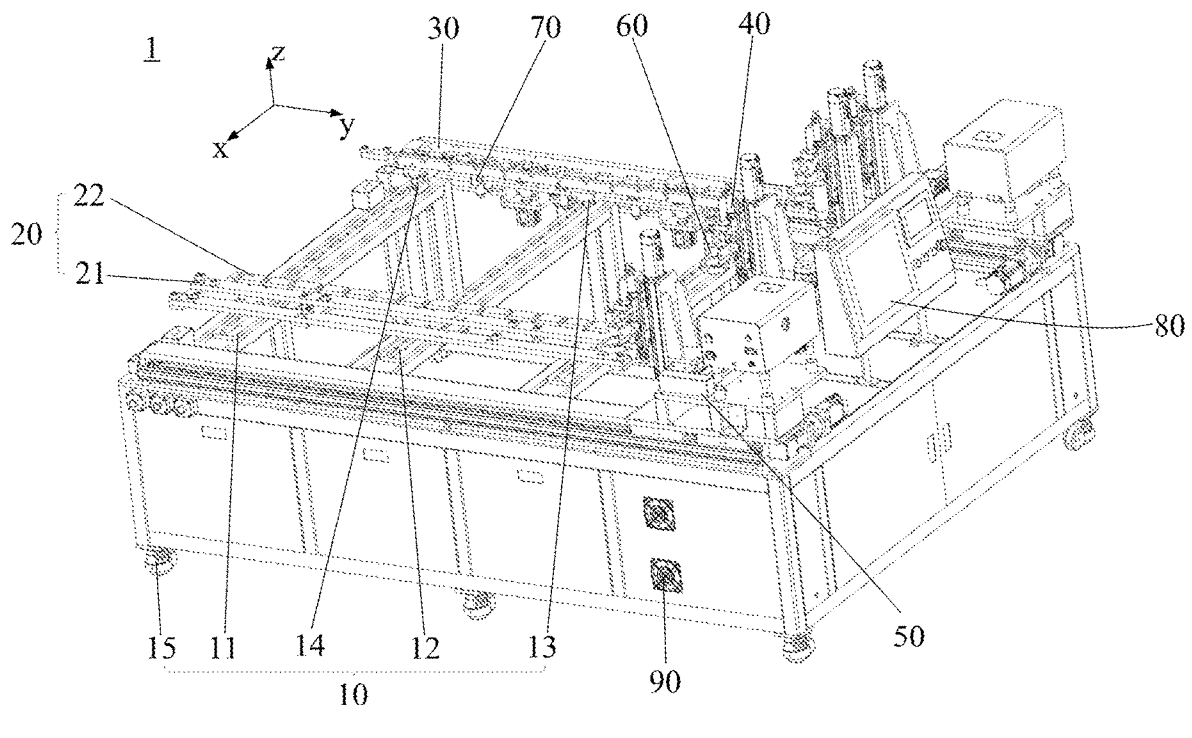
FIG. 1 is a schematic perspective view of a locking screw machine provided according to an embodiment of the present application.
FIG. 2 is a schematic structural diagram of a discharging table in the locking screw machine shown in FIG. 1.

1. Locking screw machine;

2. Workpiece; 210. First workpiece; 220. Second workpiece; 201. First location hole 201; 202. Second location hole;

10. Machine frame; 11. Workbench; 12. First slide rail; 13. First sliding block; 14. Positioning piece; 15. Wheels;

20. Discharging table; 21. First discharging table; 211. First limiting groove; 212. Limiting block; 22. Second discharging table; 221. Second limiting groove;

30. Alignment module; 31. Alignment plate; 32. First cylinder; 33. Positioning plate; 34. Second slide rail; 35. Second sliding block;

40. Electric screwdriver module; 41. Tightening gun; 42. Vacuum tube;

50. Driving unit;

51. First driving unit; 511. First driving source; 512. First sliding seat; 513. First pulley; 514. Second pulley; 515. Belt; 516. Clamping block; 517. First guide rail; 518. First slider; 519. First protective cover;

52. Second driving unit; 521. Second driving source; 522. Second sliding seat; 523. First screw rod; 524. First screw nut; 525. Second guide rail; 526. Second slider; 527, Second protective cover;

53. Third driving unit; 531. Third driving source; 532. Third sliding seat; 533. Second screw rod; 534. Third protective cover;

60. Positioning camera;

70. Jacking mechanism;

80. Operation panel;

90. Heat dissipation mechanism.

DETAILED DESCRIPTION

In order to facilitate the understanding of the present application, the present application will be described in more detail hereinafter with reference to the attached drawings and specific embodiments. It shall be noted that, when an element is expressed as being "fixed"/"disposed"/"installed" on another element, it may be directly on the other element, or there may be one or more intervening elements therebetween. When an element is said to be "connected" to another element, it may be directly connected to the other element, or there may be one or more intervening elements therebetween. Terms such as "upper end", "lower end" and similar expressions used in this specification are for illustrative purposes only.

Unless otherwise defined, all technical and scientific terms used in this specification have the same meaning as commonly understood by those skilled in the art of the present application. The terms used in the specification of the present application are only for the purpose of describing specific embodiments, and are not used to limit the present application. The term "and/or" used in this specification comprises any and all combinations of one or more associated items listed.

In addition, technical features involved in different embodiments of the present application described below can be combined with each other as long as they do not conflict with each other.

In this specification, the term "installation" comprises fixing or restricting a certain element or device to a specific position or place by welding, screwing, clamping, bonding or the like, the element or device may remain stationary in a specific position or place or move within a limited range, and the element or device is detachable or not after being fixed or restricted to a specific position or place, and this is not limited in the embodiments of the present application.

Figure 3:
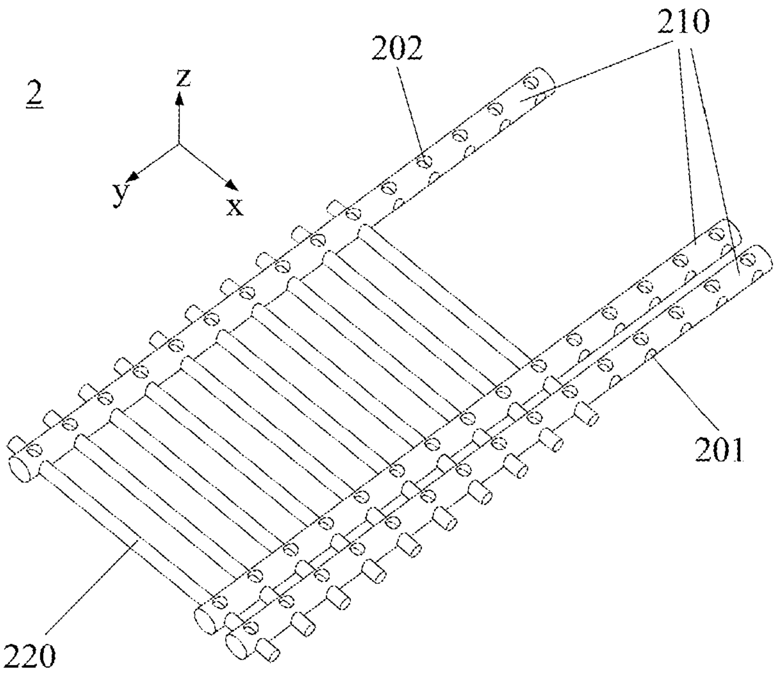
FIG. 3 is a schematic structural diagram of a workpiece.

Referring to FIG. 1 to FIG. 3 together, FIG. 1 shows a schematic structural diagram of a locking screw machine 1 provided according to an embodiment of the present application, FIG. 2 shows a schematic structural diagram of a discharging table, FIG. 3 shows a schematic structural diagram of a workpiece 2, the locking screw machine 1 of the present application is used for fixing a fence workpiece, the locking screw machine 1 of the present application comprises a machine frame 10, a discharging table 20, an alignment module 30, an electric screwdriver module 40, a driving unit 50, a positioning camera 60, a jacking mechanism 70 and an operation panel 80. A workbench 11 is arranged at the top of the machine frame 10, and the discharging table 20 is disposed on the workbench 11 and is used for the arrangement of the workpiece 2; specifically, the discharging table 20 comprises at least two first discharging tables 21 and at least two second discharging tables 22, the at least two first discharging tables 21 are arranged on the workbench 11 at intervals along a first direction x, the at least two second discharging tables 22 are arranged on the workbench 11 at intervals along the first direction x, the at least two first discharging tables 21 are arranged at the outer side of the at least two second discharging tables 22 in the first direction x, a first workpiece 210 is placed on a first discharging table 21 along a second direction y, a plurality of second workpieces 220 are arranged on the discharging table 22 at intervals along the second direction x, and two ends of the second workpiece 220 are respectively inserted into first location holes 201 of at least two first workpiece 210 on both sides of the second workpiece 220. The alignment module 30 is arranged on the workbench 11 and placed at the outer side of the first discharging table 21, and it is configured to align the plurality of second workpieces 220 along the second direction y; the electric screwdriver module 40 is arranged on the machine frame 10, and is configured to drive a screw into a second location hole 202 of the first workpiece 210 and screw the screw to realize the fixation of the first workpiece 210 and the second workpiece 220; the driving unit 50 is arranged on the machine frame 10 and electrically connected with the electric screwdriver module 40, and is configured to drive the electric screwdriver module 40 to move so as to change the spatial position of the electric screwdriver module 40; the positioning camera 60 is arranged on the electric screwdriver module 40 and is communicatively connected with the electric screwdriver module 40, and is configured to identify the second location hole 202 on the first workpiece 210; the jacking mechanism 70 is arranged on the first discharging table 21 for lifting the first workpiece 210; the operation panel 80 is electrically connected with the electronic devices of the alignment module 30, the electric screwdriver module 40, the driving unit 50 and the positioning camera 60 respectively so as to realize the input, output and interconnection of electrical signals, wherein the first direction x and the second direction y are perpendicular to each other, and the axes of the first location holes and the second location holes are perpendicular to each other.

It shall be noted that the axes of the first location hole 201 and the second location hole 202 are perpendicular to each other.

In some embodiments, as shown in FIG. 2, the first discharging table 21 is provided with a first limiting groove 211 thereon for limiting the displacement of the first workpiece 210, the second discharging table 22 is provided with second limiting grooves 221 at intervals along the first direction x, a first workpiece 210 is placed in a first limiting groove 211, and a second workpiece 220 is placed in a second limiting groove 221.

In some embodiments, the shape of the second limiting groove 221 matches the shape of the second workpiece 220.

In the embodiment of the present application, as shown in FIG. 2, there are three first discharging tables 21 and two second discharging tables 22, and the first discharging tables 21 are arranged at the outer side of the second discharging tables 22 in the first direction x; specifically, in the first direction x, one side of a first discharging table 21 is provided with one second discharging table 22, and one side of another first discharging table 21 is provided with two second discharging tables 22, and the first discharging table 21 and the second discharging table 22 at the same side are arranged adjacent to each other.

It shall be noted that, in the embodiment of the present application, the first discharging table 21 and the second discharging table 22 at the same side refer to the first discharging table 21 adjacent to the second discharging table 22 which is closest to the outer side of the second discharging table 22 in the first direction x.

As shall be appreciated, in other embodiments, the numbers of the first discharging tables and the second discharging tables may be set according to the actual situation, and no limitation is made thereto in the present application; for example, both the number of the first discharging tables and the number of the second discharging tables are two, and a first discharging table, a second discharging table, a second discharging table and a first discharging table are arranged in sequence along the first direction x, and the first discharging table and the second discharging table at the same side are arranged adjacent to each other.

In some embodiments, both the first discharging table 21 and the second discharging table 22 are strip-shaped plate structures.

In some embodiments, as shown in FIG. 2, the first discharging table 21 comprises a plurality of limiting blocks 212, the first limiting groove 211 is enclosed by the plurality of limiting blocks 212, or the first limiting groove 211 is enclosed by the plurality of limiting blocks 212 and the second discharging table 22.

As shall be appreciated, in order to facilitate the insertion of the second workpiece 220 into the corresponding first location holes 201 of the first workpiece 210, the top surface of the first discharging table 21 is lower than the top surface of the second discharging table 22 along a third direction z.

It shall be noted that, every two directions among the first direction x, the second direction y and the third direction z are perpendicular to each other.

In some embodiments, as shown in FIG. 1, in order to adapt the discharging table 20 to workpieces 2 with different sizes, a first slide rail 12 is provided below the discharging table 20 on the workbench 11, and the discharging table 20 is slidably arranged on the first slide rail 12. The first slide rail 12 extends along the first direction x, a first sliding block 13 is slidably arranged on the first slide rail 12, and the aforesaid discharging table 20 is fixedly installed on the first sliding block 13; specifically, two first sliding blocks 13 are slidably arranged on the first slide rail 12, and the first discharging table 21 and the second discharging table 22 arranged adjacent to each other on the same side are all fixed on a first sliding block 13, so that the discharging table 20 can slide along the first slide rail 12 so as to adjust the spacing between the second discharging tables according to the size of the second workpiece 220.

As shall be appreciated, in order to ensure the sliding stability of the discharging table, the number of the first slid rails is at least two, and the first slid rails are arranged on the workbench at intervals.

In some embodiments, one end of the first slide rail 12 is provided with a cylinder (not shown) for driving the first discharging table 21 to move, and the cylinder is used for driving the first discharging table to move along the first slide rail 12.

In some embodiments, positioning pieces 14 are arranged at two sides of the aforesaid first slide rail 12, the positioning pieces 14 are used for positioning the workpiece 2 (e.g., the second workpiece 220) on the discharging table 20, and the spacing between the two positioning pieces 14 is adjustable to adapt to the second workpieces 220 with different lengths.

In some embodiments, the positioning piece 14 described above is a screw; for example, the workbench is provided with a plurality of threaded holes along the first direction, and when the second discharging table (or the first discharging table) is adjusted to a suitable size, the screw is screwed into the threaded hole near the second discharging table to restrict the further sliding of the second discharging table.

In some embodiments, in order to facilitate the movement of the locking screw machine 1, wheels 15 are provided below the machine frame.

In some embodiments, the wheels 15 are universal wheels.

A fence workpiece is formed after both ends of the second workpieces 220 are inserted into the first location holes 201 of the first workpieces 210, then the second workpieces 220 are pushed along the first direction x by the aforesaid alignment module 30 so that the plurality of second workpieces 220 are aligned along the second direction y, thereby better realizing the fixation of the first workpieces 210 and the second workpieces 220 subsequently.

Figure 4:
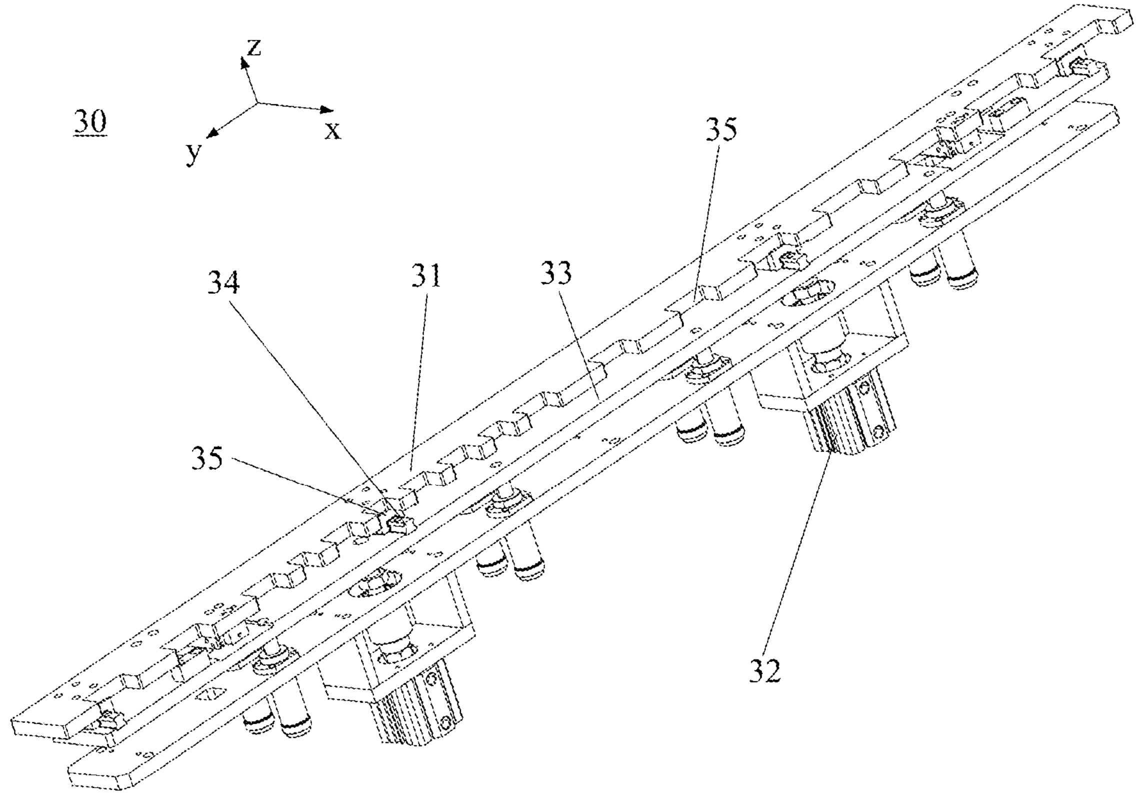
FIG. 4 is a schematic structural diagram of an alignment module in the locking screw machine shown in FIG. 1.

As shown in FIG. 4, the aforesaid alignment module 30 comprises an alignment plate 31 movably connected to the workbench 11, the alignment plate 31 can slide relative to the workbench 11 in the first direction x and can move upward and downward relative to the workbench 11 in the third direction z.

Specifically, the alignment module 30 comprises a first cylinder 32 and a positioning plate 33 connected with a telescopic end of the first cylinder 32, the control panel 80 is electrically connected with the first cylinder 32, the first cylinder 32 is installed on the workbench 11, the telescopic end of the first cylinder 32 is capable of extending and retracting in the third direction z so that the positioning plate 33 can be driven by the first cylinder 32 to move upward and downward relative to the workbench 11, the positioning plate 33 is arranged between the alignment plate 31 and the workbench 11, and the alignment plate 31 is slidably installed on the positioning plate 33; for example, a second slide rail 34 is provided at the upper end of the positioning plate 33, the second slide rail 34 extends along the first direction x, a second sliding block 35 is slidably provided on the second slide rail 34, the aforesaid alignment plate 31 is fixedly mounted on the second sliding block 35, so that the alignment plate 31 can slide relative to the positioning plate 33 and the workbench 11 to push the plurality of second workpieces 220 along the first direction x, so that the plurality of second workpieces 220 are aligned along the second direction y. The lower end of the positioning plate 33 is connected with the telescopic end of the first cylinder 32, so that under the drive of the first cylinder 32, the alignment plate 31 can move upward and downward relative to the workbench 11 to avoid the second workpiece 220; for example, before the second workpiece 220 is placed on the second discharging table 22, the alignment plate 31 is driven to move downward to prevent the alignment plate 31 from affecting the placement of the second workpiece 220.

When working, the control panel 80 controls the first cylinder 32 to drive the alignment plate 31 to move downward to a required height, and after the first workpiece 210 and the second workpiece 220 are placed well and both ends of the second workpiece 220 are inserted into the first location holes 201 of the first workpieces 210 located at both sides of the second workpiece 220, the first cylinder 32 drives the alignment plate 31 to move upward to the required height, and then pushes the alignment plate 31 in a direction close to the first workpiece 210 along the first direction x, so that the plurality of second workpieces 220 are aligned in the second direction y.

It shall be noted that, the required height described above may be determined according to the actual situation, as long as it is ensured that the solution can be implemented.

As shall be appreciated, in order to ensure the sliding stability of the alignment plate, the number of the second slide rails is at least two, the second slide rails are arranged on the positioning plate at intervals, and at least one second sliding block is arranged on one second slide rail.

In some embodiments, in order to prevent the alignment plate 31 from disengaging from the second slide rail 34 during sliding, a stopper (not shown) is provided at the end of the second slide rail 34.

In some embodiments, an avoidance groove 35 is provided at the position on the alignment plate 31 that corresponds to the limiting block 212, and the avoidance groove 35 is used to avoid the limiting block 212 when the alignment plate 31 slides in the direction close to the second workpiece 220, so as to prevent the limiting block 212 from affecting the sliding of the alignment plate 31.

Through the arrangement of the alignment module 30, the alignment of a plurality of second workpieces 220 can be realized at one time, so that it is unnecessary to push the second workpieces 220 manually and individually, and the production efficiency is improved.

Figure 5:
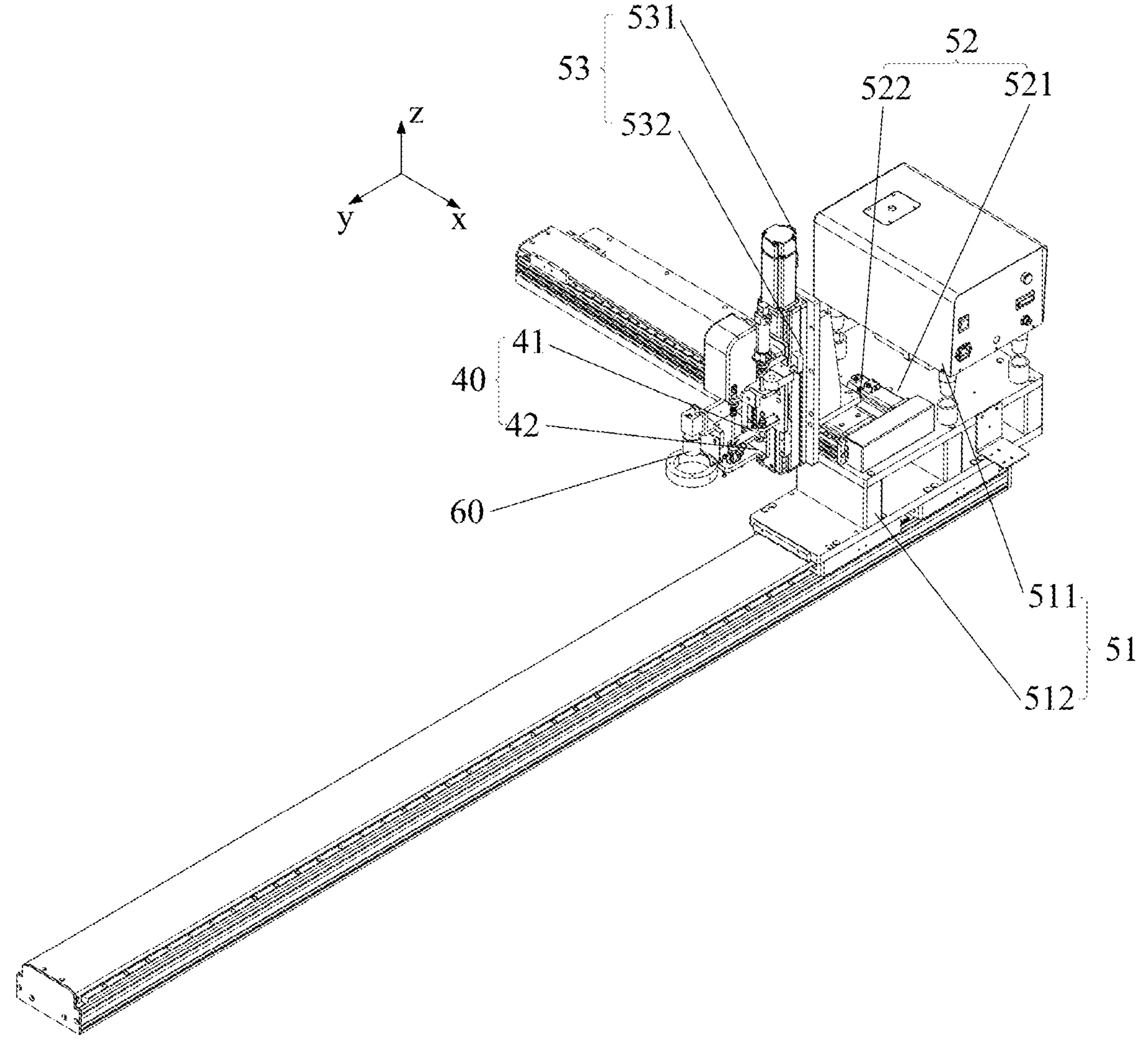
FIG. 5 is a schematic view illustrating the installation of an electric screwdriver module and a driving unit in the locking screw machine shown in FIG. 1.

As shown in FIG. 5, the electric screwdriver module 40 comprises a tightening gun 41, an output end of the tightening gun 41 is sleeved with a vacuum tube 42, an upper end of the vacuum tube 42 is an opening for a single screw to be embedded, and an output end of the tightening gun 41 extends to a lower end of the vacuum tube 42 to clamp the screw in the vacuum tube 42; the lower end of the vacuum tube 42 is provided with a negative pressure tube, one end of the negative pressure tube is in communication with the vacuum tube 42, and the other end of the negative pressure tube is in communication with an air pump, so that suction is realized at the lower end of the vacuum tube 42, and then screws are picked up. The specific picking-up process and tightening process belong to the prior art and thus will not be described in detail in the present application, and any prior art that can realize the picking up and tightening of the screws is included in the present application.

The driving unit 50 comprises a first driving unit 51, a second driving unit 52 and a third driving unit 53, the first driving unit 51 is configured to drive the electric screwdriver module 40 to slide in the second direction y, the second driving unit 52 is configured to drive the electric screwdriver module 40 to slide in the first direction x, and the second driving unit 52 is configured to drive the electric screwdriver module 40 to move upward and downward in the third direction z.

The first driving unit 51 is installed on the machine frame 10, the first driving unit 51 comprises a first driving source 511 and a first sliding seat 512 connected with an output end of the first driving source 511, the operation panel 80 is electrically connected with the first driving source 511, and the electric screwdriver module 40 is installed on the first sliding seat 512.

Figure 6:
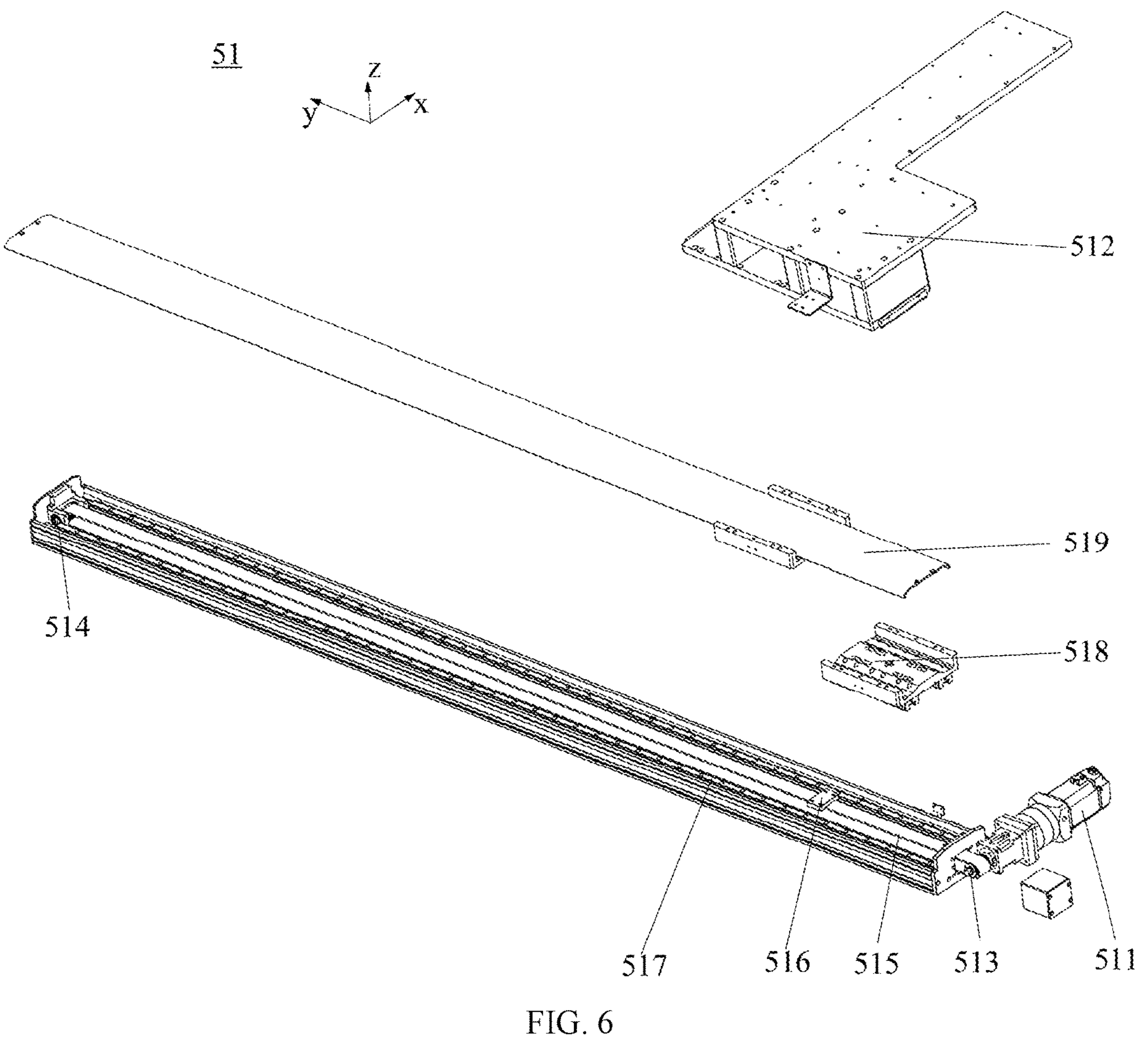
FIG. 6 is an exploded schematic view of a first driving unit in the driving unit shown in FIG. 5.

Specifically, as shown in FIG. 6, the first driving unit 51 further comprises a first pulley 513, a second pulley 514, a belt 515, a clamping block 516, a first guide rail 517, a first slider 518, and a first protective cover 519, an output end of the first driving source 511 is coaxially and fixedly connected with the first pulley 513 to drive the first pulley 513 to rotate, the belt 515 is wound between the first pulley 513 and the second pulley 514, the rotation axes of the first pulley 513 and the second pulley 514 are parallel to each other, and the rotation axes are parallel to the X axis; the clamping block 516 is slidably sleeved on the belt 515, and two first guide rails 517 are arranged side by side, the first slider 518 is slidably connected to the first guide rails 517, the belt 515 is arranged between the two first guide rails 517, the first guide rails 517 extend in the second direction y, an upper end of the first slider 518 is fixedly connected to a lower end of the first sliding seat 512, the first protective cover 519 covers right above the first guide rail 517, the first slider 518 and the belt 515, two ends of the first slider 518 along the direction parallel to the first direction x extend out of the first protective cover 519, and the two ends of the first slider 518 are used to fixedly connect the first sliding seat 512, so that when the first pulley 513 rotates, it can drive the electric screwdriver module 40 to slide in the second direction y.

In some embodiments, the first driving source 511 is a motor. As shall be appreciated, in other embodiments, the first driving source 511 may also be other transmission mechanisms as long as it can drive the first pulley to rotate; for example, the first driving source may be a gear transmission mechanism, a worm transmission mechanism and the like.

Figure 7:
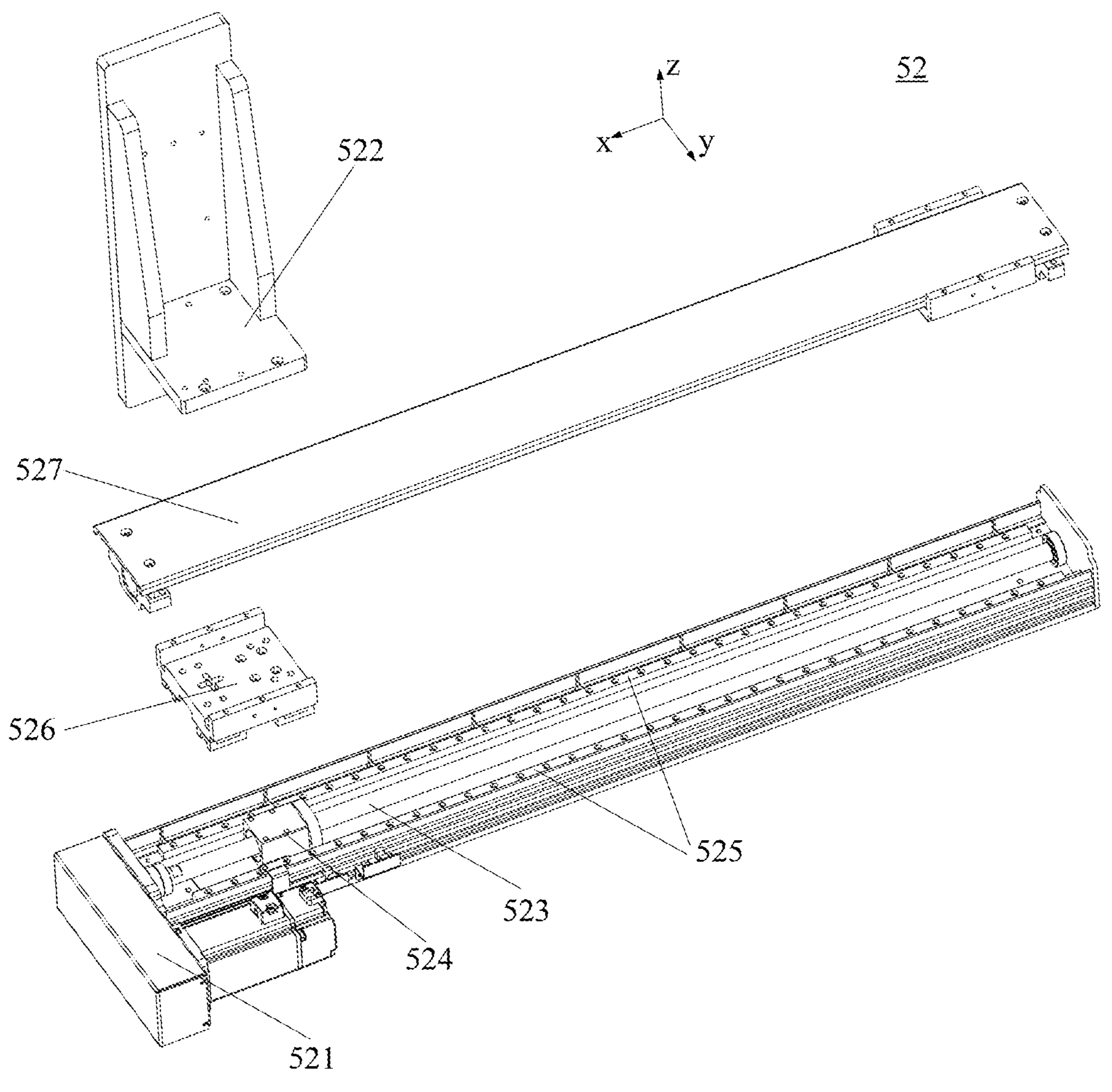
FIG. 7 is an exploded schematic view of a second driving unit in the driving unit shown in FIG. 5.

As shown in FIG. 7, the second driving unit 52 is installed on the first sliding seat 512, the second driving unit 52 comprises a second driving source 521 and a second sliding seat 522 connected with an output end of the second driving source 521, the operation panel 50 is electrically connected with the second driving source 521, and the electric screwdriver module 40 is installed on the second sliding seat 522.

Specifically, the second driving unit 52 further comprises a first screw rod 523, a first screw nut 524, a second guide rail 525, a second slider 526 and a second protective cover 527, wherein two second guide rails 525 are arranged side by side, the second slider 526 is slidably sleeved on the second guide rails 525, the first screw rod 523 is rotatably arranged around its own axis and is arranged between the two second guide rails 525, both the second guide rails 525 and the first screw rod 523 extend in a direction parallel to the first direction x, the first screw nut 524 is screwed to the first screw rod 523 to form a lead screw pair; an upper end of the first screw nut 524 is fixedly connected to a lower end of the second slider 526, an output end of the second driving source 521 is connected to the first screw rod 523 for driving the first screw rod 523 to rotate, the second protective cover 527 covers right above the first screw rod 523, the first screw nut 524, the second guide rail 525 and the second slider 526, two ends of the second slider 526 along the direction parallel to the second direction y extend out of the second protective cover 527, and the two ends of the second slider 526 are used for fixedly connecting the second sliding seat 522, so that when the first screw rod 523 rotates, it can drive the electric screwdriver module 40 to slide along the first direction x.

In some embodiments, the second driving source 521 is a motor. As shall be appreciated, in other embodiments, the second driving source may also be other transmission mechanisms, as long as it can drive the first screw rod to rotate. For example, the second driving source may be a gear transmission mechanism, a worm transmission mechanism and the like.

Figure 8:
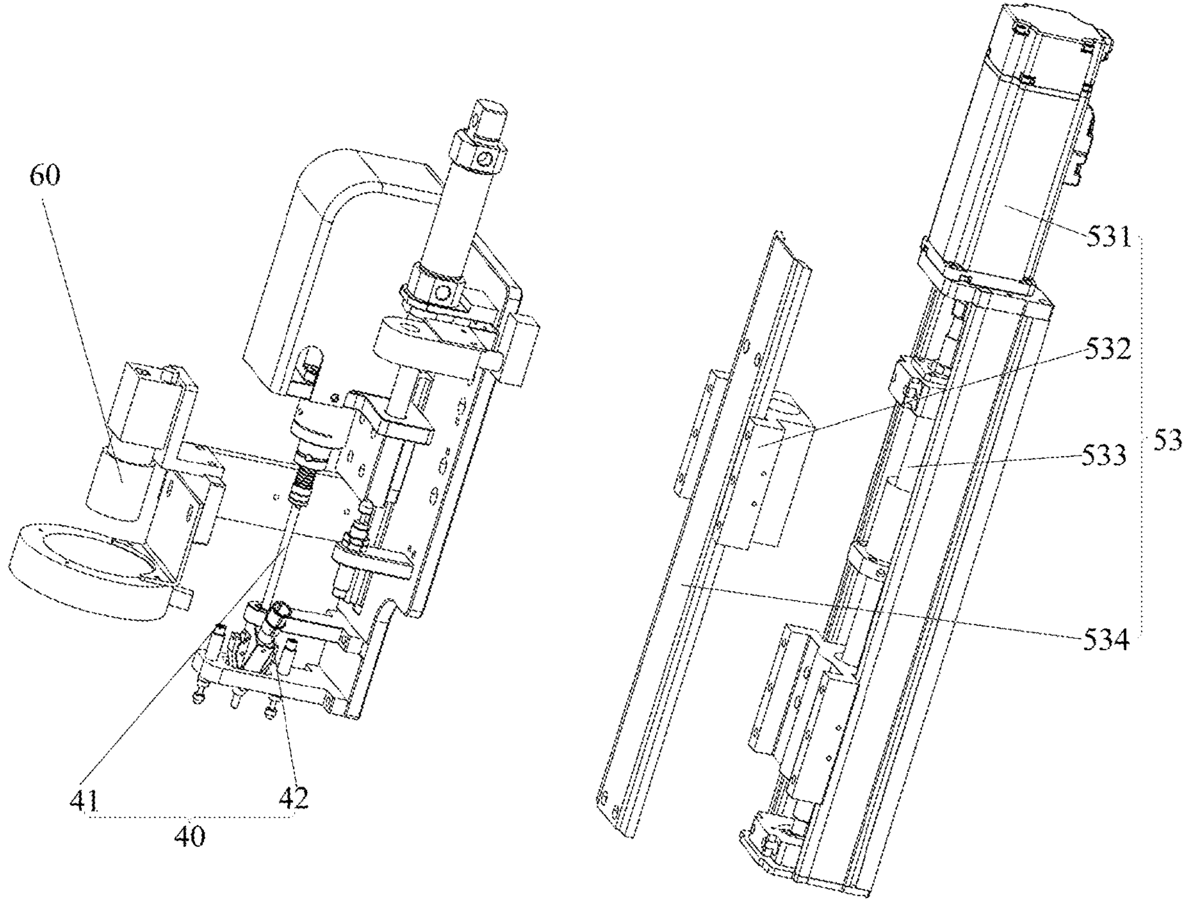
FIG. 8 is a schematic view illustrating the installation of a third driving unit and the electric screwdriver module in the driving unit shown in FIG. 5.

As shown in FIG. 8, the third driving unit 53 is installed on the second sliding seat 522, the third driving unit 53 comprises a third driving source 531 and a third sliding seat 532 connected with an output end of the third driving source 531, the operation panel 80 is electrically connected with the third driving source 531, and the electric screwdriver module 40 is installed on the third sliding seat 532.

Specifically, the third driving unit 53 further comprises a second screw rod 533 and a third protective cover 534, the second screw rod 533 extends in a direction parallel to the third direction z, the second screw rod 533 is rotatably arranged around its own axis, an output end of the third driving source 531 is coaxially and fixedly connected with the second screw rod 533 for driving the second screw rod 533 to rotate, the third sliding seat 532 is connected to the second screw rod 533 by threaded connection to form a lead screw pair; the third protective cover 534 covers right above the second screw rod 533 and the third sliding seat 532, two ends of the third sliding seat 532 along the direction parallel to the second direction y extends out of the third protective cover 534, and the two ends of the third sliding seat 532 are used for fixedly connecting the electric screwdriver module 40, so that when the second screw rod 533 rotate, it can drive the electric screwdriver module 40 to move upward and downward in the third direction z.

In some embodiments, the third driving source 531 is a motor. As shall be appreciated, in other embodiments, the third driving source may also be other transmission mechanisms as long as it can drive the second screw rod to rotate. For example, the third driving source may be a gear transmission mechanism, a worm transmission mechanism and the like.

As shown in FIG. 8, the positioning camera 60 is installed on the electric screwdriver module 40 and arranged right in front of the electric screwdriver module 40, so that the positioning camera 60 can move along with the electric screwdriver module 40; the positioning camera 60 is driven by the driving unit 50 to move to identify the second location hole 202 on the first workpiece 210, and sends the coordinates of the second location hole 202 identified to the electric screwdriver module 40 and the operation panel 80, and then the operation panel 80 performs calculation according to the coordinates, and according to the calculation result, the operation panel 80 controls the driving unit 50 to drive the electric screwdriver module 40 to move to the position corresponding to the second location hole 202, and controls the electric screwdriver module 40 to perform the screwing operation.

In some embodiments, the positioning camera 60 is a charge coupled device (CCD) camera.

Automatic positioning by CCD camera is efficient, accurate and fast, and in addition, the CCD camera is arranged right in front of the electric screwdriver module, and the CCD takes pictures while the electric screwdriver module is locking the screws, thereby avoiding taking pictures for two times, and thus saving time.

In some embodiments, a light source is provided below the positioning camera 60 to facilitate the positioning camera 60 to identify the second location hole 202.

In some embodiments, in order to speed up the efficiency, two electric screwdriver modules 40 are arranged on the third sliding seat 532 along the first direction x.

In some embodiments, in order to further speed up the work efficiency, a driving unit 50 is arranged on each of two sides of the discharging table 20 along the first direction x, and each driving unit 50 is provided thereon with two electric screwdriver modules 40.

As shown in FIG. 2, after the screw fastening operation is completed by the electric screwdriver module 40, for convenience of picking up the workpiece 2, the locking screw machine 1 comprises the aforesaid jacking mechanism 70 for jacking up the first workpiece 210 after the first workpiece 210 is fixed with the second workpiece 220 so as to facilitate material unloading.

In the embodiment of the present application, the jacking mechanism 70 is a second cylinder which is fixed below the second discharging table 21, an telescopic end of the second cylinder penetrates through the first discharging table 21, and the telescopic end of the second cylinder can extend and retract in the third direction z. Through the extension and retraction of the second cylinder, the first workpiece 210 is jacked up to a required height to be picked up conveniently, thereby saving labor.

As shall be appreciated, in other embodiments, the aforesaid jacking mechanism may also be other devices, such as a hydraulic lifting platform, and any jacking mechanism that can lift the first workpiece is included in the present application.

In some embodiments, the above-mentioned locking screw machine 1 further comprises a heat dissipation mechanism 90, the heat dissipation mechanism 90 is installed on the machine frame 10 and is configured to dissipate heat from transmission equipment (e.g., a driving unit, an electric screwdriver module, etc.) on the locking screw machine 1.

The locking screw machine provided according to this embodiment can align a plurality of second workpieces at one time through the arrangement of the alignment module, and can realize automatic screw screwing through the arrangement of the positioning camera, the electric screwdriver module and the driving unit, thereby saving labor and improving production efficiency.

Finally, it shall be noted that, the above embodiments are only used to illustrate rather than limit the technical solution of the present application; under the idea of the present application, the technical features in the above embodiments or different embodiments may also be combined, and the steps can be implemented in any order, and there are many other changes in different aspects of the present application as mentioned above, which are not provided in details for brevity; although the present application has been described in detail with reference to the foregoing embodiments, it shall be appreciated by those skilled in the art that: they can still modify the technical solutions recorded in the foregoing embodiments or replace some technical features with equivalents; however, these modifications or replacements do not make the essence of the corresponding technical solutions deviate from the scope of the technical solutions of various embodiments of the present application.

What is claimed is:

1. A locking screw machine, being characterized in that, comprising:

a machine frame, a workbench being arranged at a top of the machine frame;

a discharging table, comprising at least two first discharging tables and at least two second discharging tables, the at least two first discharging tables being arranged on the workbench at intervals along a first direction, the at least two second discharging tables being arranged on the workbench at intervals along the first direction, the at least two first discharging tables being arranged at an outer side of the at least two second discharging tables, a first workpiece being placed on one of the at least two first discharging tables along a second direction, a plurality of second workpieces being arranged on the at least two second discharging tables at intervals along the second direction, and two ends of the second workpieces are respectively inserted into first location holes of the first workpieces on both sides of the second workpieces;

an electric screwdriver module, being arranged on the machine frame, and being configured to drive a screw into a second location hole of the first workpiece and screw the screw to realize a fixation of the first workpiece and of at least one of the plurality of second workpieces;

a positioning camera, being arranged on the electric screwdriver module and being communicatively connected with the electric screwdriver module, and being configured to identify the second location hole on the first workpiece;

a driving unit, being arranged on the machine frame and connected with the electric screwdriver module, and being configured to drive the electric screwdriver module to move so as to change a spatial position of the electric screwdriver module;

an alignment module, being arranged on the workbench, being arranged at an outer side of the one of the at least two first discharging table along the first direction, and being configured to push the plurality of second workpieces along the first direction so that the plurality of second workpieces are aligned along the second direction;

wherein the first direction and the second direction are perpendicular to each other, and axes of the first location hole and the second location hole are perpendicular to each other;

wherein a top of the one of the at least two first discharging tables is lower than a top of one of the at least two second discharging tables along a third direction, and the third direction is perpendicular to both the first direction and the second direction; and further comprises a jacking mechanism;

wherein the jacking mechanism comprises a second cylinder which is fixed below the one of the at least two second discharging tables, a telescopic end of the second cylinder penetrates through the one of the at least two first discharging tables, and the telescopic end of the second cylinder is capable of extending and retracting along the third direction.

2. The locking screw machine according to claim 1, being characterized in that, the alignment module comprises an alignment plate movably connected to the workbench, the alignment plate is capable of sliding relative to the workbench in the first direction, and the alignment plate is capable of moving upward and downward relative to the workbench in the third direction.

3. The locking screw machine according to claim 2, being characterized in that, the alignment module comprises a first cylinder and a positioning plate connected with a telescopic end of the first cylinder, the first cylinder is installed on the workbench, the telescopic end of the first cylinder is capable of extending and retracting in the third direction, the positioning plate is arranged between the alignment plate and the workbench, and the alignment plate is slidably installed on the positioning plate.

4. The locking screw machine according to claim 2, being characterized in that, the at least two first discharging tables comprise first limiting grooves, and the first workpiece is arranged in one of the first limiting grooves;

the at least two second discharging tables are provided with a plurality of second limiting grooves at intervals along the second direction, and one of the plurality of second workpieces is arranged in one of the plurality of second limiting grooves.

5. The locking screw machine according to claim 4, being characterized in that, in the first direction, at least one of the at least two first discharging tables and at least one of the at least two second discharging tables at a same side are disposed adjacent to each other, and the at least one first discharging table and the at least one second discharging table at the same side are capable of sliding relative to the workbench in the first direction.

6. The locking screw machine according to claim 5, being characterized in that, the workbench is provided with a first slide rail below the discharging table, the first slide rail extends along the first direction, two first sliding blocks are slidably arranged on the first slide rail, and the at least one first discharging table and the at least one second discharging table at the same side are all fixed to one of the first sliding blocks.

7. The locking screw machine according to claim 6, being characterized in that, in the first direction, positioning pieces are provided respectively at two sides of the first slide rail, and spacing between the positioning pieces is adjustable.

8. The locking screw machine according to claim 5, being characterized in that, the at least two first discharging tables comprise a plurality of limiting blocks, and the first limiting grooves are enclosed by the plurality of limiting blocks, or the first limiting grooves are enclosed by the plurality of limiting blocks together with the at least two second discharging tables.

9. The locking screw machine according to claim 8, being characterized in that, in the first direction, an avoidance groove is provided at a position of the alignment plate that corresponds to one of the plurality of limiting blocks.

10. The locking screw machine according to claim 1, being characterized in that, the driving unit comprises a first driving unit, a second driving unit and a third driving unit, wherein the first driving unit is configured to drive the electric screwdriver module to slide along the second direction, the second driving unit is configured to drive the electric screwdriver module to slide along the first direction, and the third driving unit is configured to drive the electric screwdriver module to slide along the third direction.

11. The locking screw machine according to claim 10, being characterized in that, the first driving unit is installed on the machine frame, the first driving unit comprises a first driving source and a first sliding seat connected with an output end of the first driving source, and the electric screwdriver module is installed on the first sliding seat;

the second driving unit is installed on the first sliding seat, the second driving unit comprises a second driving source and a second sliding seat connected with an output end of the second driving source, and the electric screwdriver module is installed on the second sliding seat;

the third driving unit is installed on the second sliding seat, the third driving unit comprises a third driving source and a third sliding seat connected with an output end of the third driving source, and the electric screwdriver module is installed on the third sliding seat.

12. The locking screw machine according to claim 1, being characterized in that, comprising an operation panel;

the operation panel is electrically connected with the alignment module, the electric screwdriver module, the driving unit and the positioning camera respectively.

* * * * *